(12) United States Patent
Kakizaki et al.

(10) Patent No.: US 10,029,536 B2
(45) Date of Patent: Jul. 24, 2018

(54) INTEGRATED FRONT AND REAR HVAC SYSTEM

(75) Inventors: Shinji Kakizaki, Dublin, OH (US); Junichi Kanemaru, Upper Arlington, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 827 days.

(21) Appl. No.: 12/475,027

(22) Filed: May 29, 2009

(65) Prior Publication Data

US 2010/0304654 A1  Dec. 2, 2010

(51) Int. Cl.
*B60H 1/00* (2006.01)

(52) U.S. Cl.
CPC ... *B60H 1/00064* (2013.01); *B60H 2001/002* (2013.01); *B60H 2001/00099* (2013.01); *B60H 2001/00135* (2013.01)

(58) Field of Classification Search
CPC .............. B60H 1/00064; B60H 1/0005; B60H 1/00057; B60H 1/00071; B60H 2001/00099; B60H 2001/00135; B60H 2001/002
USPC ........ 454/305, 121, 127, 156, 158, 126, 160
See application file for complete search history.

(56) References Cited

U.S. PATENT DOCUMENTS

| | | | | |
|---|---|---|---|---|
| 4,406,214 A * | 9/1983 | Sakurai | ......................... | 454/126 |
| 4,741,258 A * | 5/1988 | Trube et al. | .................... | 454/127 |
| 4,956,979 A * | 9/1990 | Burst et al. | ....................... | 62/244 |
| 5,526,650 A | 6/1996 | Iritani et al. | | |
| 5,619,862 A * | 4/1997 | Ruger et al. | ..................... | 62/409 |
| 5,699,960 A * | 12/1997 | Kato | .................... | B60H 1/0065 237/12.3 A |
| 6,029,739 A * | 2/2000 | Izawa et al. | ..................... | 165/42 |
| 6,110,035 A * | 8/2000 | Uemura et al. | ................ | 454/121 |
| 6,135,201 A * | 10/2000 | Nonoyama et al. | .......... | 165/202 |
| 6,138,749 A * | 10/2000 | Kawai et al. | .................. | 165/204 |
| 6,247,530 B1 | 6/2001 | Mochizuki et al. | | |

(Continued)

FOREIGN PATENT DOCUMENTS

DE 3820431 7/1989
DE 102007019382 10/2007

(Continued)

OTHER PUBLICATIONS

Office Action of CN Serial No. 201010192988.8 dated Jan. 27, 2015, 5 pages.
Search Report of CN Serial No. 201010192988.8 dated Jan. 27, 2015, 2 pages.
Office Action of JP 2010-123152 dated Feb. 18, 2014, 4 pages.
Office Action of JP 2010-123152 dated Feb. 18, 2014 (English translation), 5 pages.

*Primary Examiner* — Gregory Huson
*Assistant Examiner* — Dana Tighe
(74) *Attorney, Agent, or Firm* — Rankin, Hill & Clark LLP (57) ABSTRACT

An HVAC system for a vehicle includes a housing, a front HVAC unit housed in the housing and having a front blower, a first airflow path, and a front air mix door, a rear HVAC unit housed in the housing and having a rear blower, a second airflow path, and a rear air mix door. The HVAC system further includes an evaporator having a first portion disposed in the first airflow path and a second portion disposed in the second airflow path, and a heating core having a first portion disposed in the first airflow path and a second portion disposed in the second airflow path. An airflow directional door is disposed between the first airflow path and the second airflow path to regulate airflow from the rear blower to the first airflow path.

21 Claims, 7 Drawing Sheets

(56) References Cited

U.S. PATENT DOCUMENTS

| | | | |
|---|---|---|---|
| 6,253,841 B1 * | 7/2001 | Obara et al. | 165/204 |
| 6,304,803 B1 | 10/2001 | Dao | |
| 6,308,770 B1 * | 10/2001 | Shikata | B60H 1/00064 165/126 |
| 6,311,763 B1 * | 11/2001 | Uemura et al. | 165/43 |
| 6,431,267 B1 | 8/2002 | Tanaka | |
| 6,463,998 B1 | 10/2002 | Shindo | |
| 6,578,771 B2 * | 6/2003 | Kaneura et al. | 237/12.3 B |
| 6,588,495 B2 * | 7/2003 | Ito et al. | 165/41 |
| 6,598,665 B2 * | 7/2003 | Schwarz | 165/42 |
| 6,640,571 B2 * | 11/2003 | Matsunaga | B60H 1/00028 165/42 |
| 6,926,253 B2 | 8/2005 | Tokunaga et al. | |
| 7,013,967 B2 | 3/2006 | Kondo | |
| 7,228,895 B2 | 6/2007 | Natsume et al. | |
| 2004/0093885 A1 | 5/2004 | Ito et al. | |
| 2004/0231834 A1 | 11/2004 | Shibata et al. | |
| 2005/0126774 A1 | 6/2005 | Yamaguchi et al. | |
| 2006/0175050 A1 | 8/2006 | Kang et al. | |
| 2007/0107892 A1 | 5/2007 | Sato et al. | |
| 2009/0117841 A1 | 5/2009 | Goto et al. | |

FOREIGN PATENT DOCUMENTS

| | | | |
|---|---|---|---|
| FR | 2400161 A | * | 4/1979 |
| JP | 63074711 A | * | 4/1988 |
| JP | H02127035 U | | 10/1990 |
| JP | H10029424 A | | 2/1998 |
| JP | H10278547 A | | 10/1998 |
| JP | H11170841 A | | 6/1999 |
| JP | 2000158931 A | | 6/2000 |
| JP | 2000168346 A | | 6/2000 |
| JP | 2000260644 A | | 9/2000 |
| JP | 2001010327 | | 1/2001 |
| JP | 2001130236 A | | 5/2001 |
| JP | 2003285624 A | | 10/2003 |
| JP | 2008080889 A | | 4/2008 |
| JP | 2008081024 A | | 4/2008 |
| KR | 20070050247 | | 5/2007 |

* cited by examiner

INTEGRATED FRONT AND REAR HVAC SYSTEM

FIELD OF THE INVENTION

The present invention relates to an HVAC system for a vehicle and more specifically to an HVAC system with an integrated evaporator and heating core.

BACKGROUND

Figure 1:
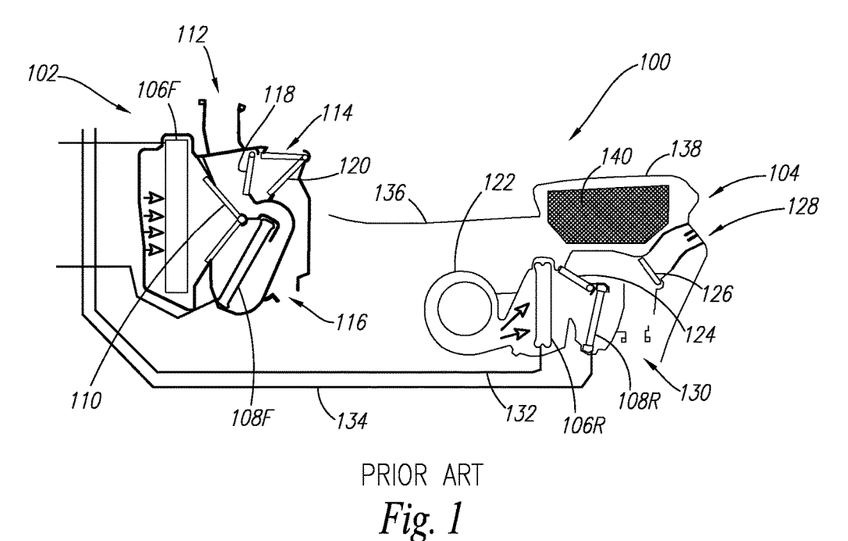
FIG. 1 is a schematic view of a conventional dual HVAC system.

FIG. 1 shows a conventional dual HVAC system 100, which requires two independent HVAC units, a front HVAC unit 102 to cool the front of the vehicle and a rear HVAC unit 104 to cool the rear of the vehicle. The front HVAC unit 102 and the rear HVAC unit 104 are each housed in separate housings whereby the front HVAC unit 102 is disposed toward the front of the vehicle and the rear HVAC unit 104 is disposed toward the rear of the vehicle.

The front HVAC unit 102 includes a front blower (not shown), an evaporator 106F, a heating core 108F, and an air mix door 110. The air mix door 110 is movable between a first position whereby all the air is directed through the heating core 108F and a second position where all the air is directed through the evaporator 106F. Airflow through the evaporator 106F, the heating core 108F or a combination thereof is directed to one or more of a defroster outlet 112, a vent outlet 114, or a heater outlet 116.

The front HVAC unit 102 further includes a defroster door 118 and a vent/heater door 120. The defroster door 118 is movable between a first and second position to regulate the amount of airflow that exits the defroster outlet 112. When the defroster door 118 is in the first position the defroster outlet 112 is closed and airflow is directed to the vent outlet 114, the heater outlet 116 or a combination thereof. When the defroster door is in the second position the defroster outlet 112 is open and the airflow exits through the defroster outlet 112. The vent/heater door 120 is also movable between a first and second position to regulate airflow through the vent outlet 114 and the heater outlet 116 in a similar manner as the defroster door 118.

The rear HVAC unit 104 also includes an evaporator 106R and a heating core 108R. The rear HVAC unit 104 further includes a rear blower 122, an air mix door 124, and an airflow direction door 126. The air mix door 124 operates in a similar manner to the air mix door 110 in the front HVAC unit 102. The airflow direction door 126 regulates airflow between one or more upper vents 128 and one or more floor vents 130.

Thus, a major disadvantage to the conventional dual HVAC system 100 is the requirement of two housings, two evaporators 106F, 106R, and two heating cores 108F, 108R, which increases assembly and manufacturing costs.

Another disadvantage to the conventional dual HVAC system 100 is that because the rear HVAC unit 104 is located toward the rear of the vehicle, the rear HVAC unit 104 requires a longer refrigerant line 132 and heating core line 134, which in turn leads to increased material and assembly costs. Further, more connecting joints are required to run the refrigerant line 132 and the heating core line 134 from the engine compartment to the rear HVAC unit 104, thereby increasing the probability of fluid leaking at any one joint in each line.

Yet another disadvantage to the conventional HVAC system 100 is that the rear HVAC unit 104 occupies space in a center console 136 that can otherwise be utilized as storage space. Specifically, the rear HVAC unit 104 is located in the center console 136 below an arm rest 138 and a storage compartment 140. As clearly show in FIG. 1, the rear HVAC unit 104 limits the amount of storage space in the center console 136.

Thus, what is required is a dual HVAC system that overcomes the above mentioned disadvantages.

SUMMARY

In accordance with one aspect, the present invention overcomes the above mentioned disadvantages by providing an HVAC system for a vehicle that includes a housing, a front HVAC unit housed in the housing and having a front blower, a first airflow path, and a front air mix door, a rear HVAC unit housed in the housing and having a rear blower, a second airflow path, and a rear air mix door. The HVAC system further includes an evaporator having a first portion disposed in the first airflow path and a second portion disposed in the second airflow path, and a heating core having a first portion disposed in the first airflow path and a second portion disposed in the second airflow path. An airflow directional door disposed between the first airflow path and the second airflow path to regulate airflow from the rear blower to the first airflow path.

In accordance with another aspect, the present invention provides a bypass door movable between a first position and a second position, wherein when the bypass door is in the second position a portion of airflow from the first portion of the evaporator bypasses the first airflow path and is directed directly to a front outlet such that a temperature of the airflow can be regulated independently of a position of the front air mix door.

In accordance with yet another aspect, the present invention provides a defroster duct and a defroster outlet divider disposed in a middle of the defroster outlet thereby forming a first defroster outlet and a second defroster outlet, wherein the front HVAC unit further includes a defroster outlet door having air deflection bracket extending from a top of the defroster outlet door, and wherein the defroster outlet door is movable between a first position, a second position, and a third position to regulate airflow through the first defroster outlet and the second defroster outlet.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION

Referring now to the drawings, FIGS. 2-12 show several exemplary embodiments of a dual-integrated HVAC system 10 (hereinafter "HVAC system") for an automotive vehicle in accordance with the present invention. The HVAC system is a dual HVAC system in that the HVAC system supplies heating and cooling air to both the front and rear of the vehicle. Further, the HVAC system is an integrated HVAC system for two reasons. First, the HVAC system includes a front HVAC unit and a rear HVAC unit both housed in the same housing. Second, the HVAC system requires only a single evaporator and a single heating core for both the front and rear HVAC units. It should be noted that the evaporator and heating core of the present invention are larger than the standard evaporator and heating core for the conventional HVAC system described above. Thus, the heating/cooling efficiency and capacity of the dual-integrated HVAC system is not compromised.

As will become evident from the description below, the HVAC system has several features in addition to the single evaporator and heating core mentioned above. One such feature is that the HVAC system has the ability to independently control airflow temperature exiting through outlets toward the front of the vehicle irrespective of airflow temperature to exiting any other ventilation outlets in the system. Another feature of the HVAC system is a dual airflow defroster feature to control airflow through one or more defroster outlets. Still yet another feature is that the HVAC system includes a directional door that when in a closed position directs all the air from the rear HVAC unit to the front of the vehicle. Still yet another feature of the HVAC system is a frost prevention feature to prevent frost build-up on the evaporator when the rear HVAC unit is in an "OFF" position.

Referring now to FIGS. 2A, 2B, and 3-5, the HVAC system 10 includes a housing 12 that houses a front HVAC unit 14 and a rear HVAC unit 16. The HVAC system 10 further includes an evaporator 18, a heating core 20, an airflow directional door 22, and a drain opening 24 disposed in a bottom of the rear HVAC unit 16. The evaporator 18, which is oriented in a substantially vertical position, extends between the front HVAC unit 14 and the rear HVAC unit 16 and includes a first portion 26 disposed in the front HVAC unit 14 and a second portion 28 disposed in the rear HVAC unit 16. Water condensation generated by both the first portion 26 and the second portion 28 of the evaporator 18 drains out a bottom of the second portion 28 of the evaporator 18 and exits the HVAC system 10 via the drain opening 24. It should be noted that high humidity fresh air from outside the vehicle circulates through the first portion 26 of the evaporator 18 and low humidity re-circulated air from inside the vehicle circulates through the second portion 28 of the evaporator 18. Thus, very little water condensation is generated in the second portion 28 of the evaporator 18 due to the circulated low humidity air. The heating core 20, which is oriented in a generally vertical position, extends between the front HVAC unit 14 and the rear HVAC unit 16 and includes a first portion 30 disposed in the front HVAC unit 14 and a second portion 32 disposed in the rear HVAC unit 16.

Figure 2A:
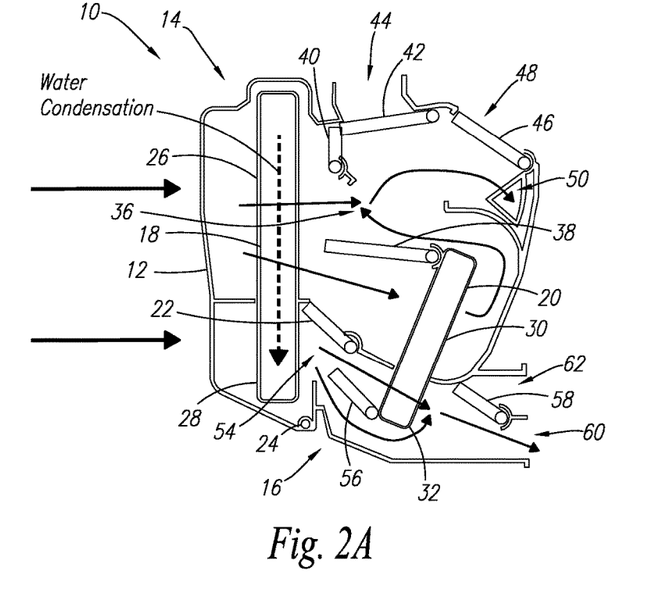
FIG. 2A shows a schematic side view of an HVAC system according to one exemplary embodiment of the present invention.
Figure 2B:
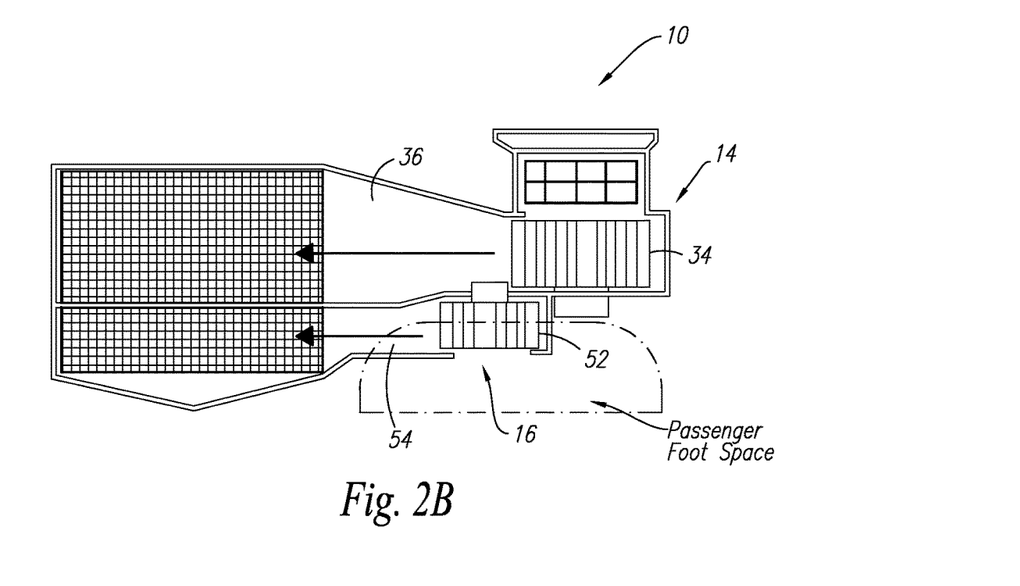
FIG. 2B shows a schematic side view of the HVAC system of FIG. 2A as viewed from the passenger seat.

The front HVAC unit 14 includes a front blower 34, a front (or first) airflow path 36, a front air mix door 38, a bypass door 40, a defroster outlet door 42 to regulate airflow exiting a defroster outlet 44, and a vent/heater outlet door 46 to regulate airflow exiting a vent outlet 48, and/or a heater (or floor) outlet 50.

The front air mix door 38, which is located between the first portion 26 of the evaporator 18 and the first portion 30 of the heating core 20, controls a temperature of an airflow through the first airflow path 36. The first portion 26 of the evaporator 18 and the first portion 30 of the heating core 20 are disposed in the first airflow path 36. Thus, the front air mix door 38 can be rotated to different positions to change the ratio of cold air that flows from the first portion 26 of the evaporator 18 directly to the first airflow path 36 and from the first portion 26 of the evaporator 18 through the first portion 30 of the heating core 20. The airflow from the first portion 26 of the evaporator 18 that flows through the first portion 30 of the heating core 20 re-enters the first airflow path 36 and mixes with the cold air from the first portion 26 of the evaporator 18 to thereby form an airflow having the desired temperature that will exit the front HVAC unit 14. Thus, the temperature of the airflow through the first airflow path 36 is adjusted by rotating the mixing door 38.

Figure 3:
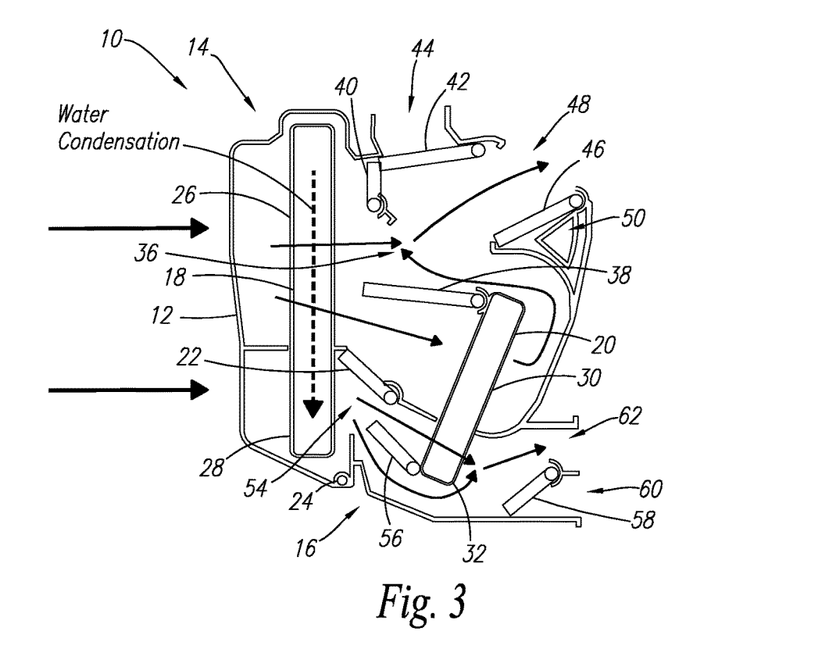
FIGS. 3-5 show schematic views of the HVAC system of FIGS. 2A and 2B illustrating multiple airflow patterns.
Figure 4:
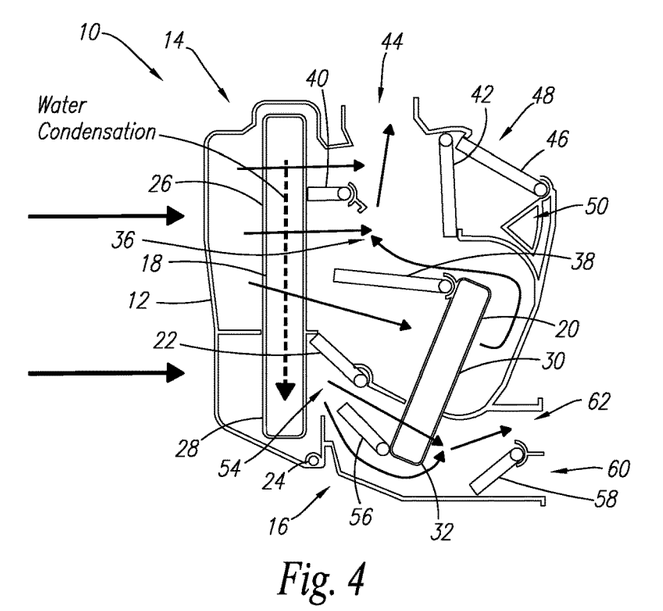
Figure 5:
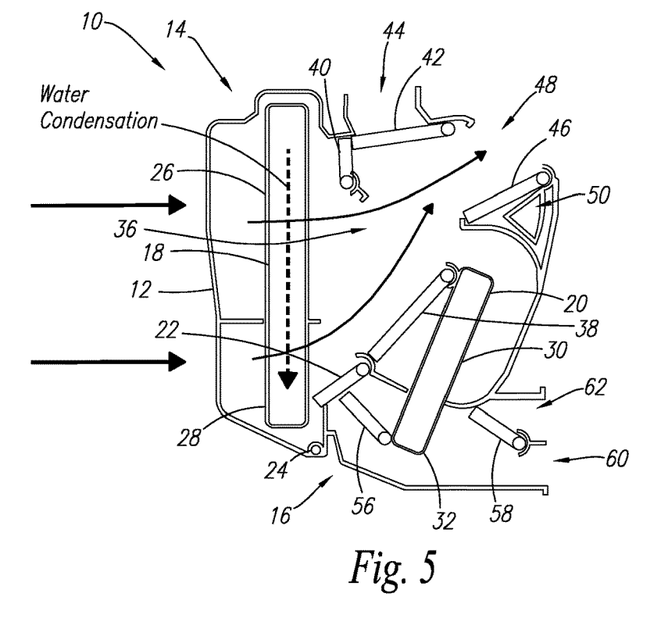

The bypass door 40 is movable between a first (or closed) position, as shown in FIGS. 2A, 3, and 5, and a second (or open) position, as shown in FIG. 4. The bypass door 40 allows for an optional-independent control of an airflow temperature exiting any front outlet 44, 48, 50 irrespective of the position of the front air mix door 38. In the embodiment shown in FIG. 4, the operation of the bypass door 40 is illustrated and will be explained in conjunction with the defroster outlet 44. It should be noted that the bypass door 40 can be used to independently control an airflow temperature exiting the vent outlet 48, and/or a heater (or floor) outlet 50 in the same manner as described below.

Referring to FIG. 4, when the bypass door 40 is in an open position a portion of airflow from the evaporator 18 bypasses the first airflow path 36 and is directed directly to the defroster outlet 44. The position of the bypass door 40 can be rotated to any position between the closed position and the open position to regulate the amount of airflow from the evaporator 18 directly to the defroster outlet 44. Thus, the airflow temperature exiting the defroster outlet 44 can be adjusted without adjusting the position of the front air mix door 38.

The defroster outlet door 42 is movable from a first or closed position, shown in FIGS. 2A, 3, and 5, to a second or open position, shown in FIG. 4. When the defroster outlet door 42 is in the closed position the airflow is directed toward the vent 48 and the heater 50 outlets and the front HVAC unit 14 is in either a vent or heat mode, which will be explained further below. When the defroster outlet door 42 is in the open position the airflow is directed toward the defroster outlet 44 and the front HVAC unit 14 is in a defrost mode. Further, the defroster door 42 can be rotated to any position between the closed and open position to thereby regulate the amount or airflow that exits the defroster outlet 44.

The vent/heater outlet door 46 is movable from a first position, shown in FIG. 2A, to a second position, shown in FIGS. 3-5. The vent/heater outlet door 46 regulates the amount or airflow that exits the vent 48 and the heater 50 outlets. Specifically, when the vent/heater outlet door 46 is in the first position and the defroster door 42 is closed the airflow is directed toward the heater outlet 50 and the front HVAC unit 14 is in the heat mode. Similarly, when the vent/heater outlet door 46 is in the second position and the defroster door 42 is closed the airflow is directed toward the vent outlet 48 and the front HVAC unit 14 is in the vent mode. When the vent/heater outlet door 46 is in any position between the first and second positions the airflow is directed toward both the vent 48 and heater 50 outlets and the front HVAC unit 14 is in a vent/heat mode.

It should be noted that it is possible to direct the airflow to all three outlets 44, 48, 50 when the defroster outlet door 42 and the vent/heater outlet door 46 are both between their respective first and second positions.

The rear HVAC unit 16 includes a rear blower 52, a rear (or second) airflow path 54, a rear air mix door 56, a rear-vent outlet door 58 to regulate airflow exiting a rear vent outlet 60 and/or a heater outlet 62.

The rear air mix door 56, which is located between the second portion 28 of the evaporator 18 and the second portion 32 of the heating core 20, controls a temperature of an airflow through the second airflow path 54. The second portion 28 of the evaporator 18 and the second portion 32 of the heating core 20 are disposed in the second airflow path 54. Thus, the rear air mix door 56 can be rotated to different positions to change the ratio of cold air that flows from the second portion 28 of the evaporator 18 directly to the second airflow path 54 and from the second portion 28 of the evaporator 18 through the second portion 32 of the heating core 20. The airflow from the second portion 28 of the evaporator 18 through the second portion 32 of the heating core 20 re-enters the second airflow path 54 and mixes with the cold air from the second portion of the evaporator 18 to thereby form an airflow having the desired temperature that will exit the rear HVAC unit 16. Thus, the temperature of the airflow through the second airflow path 54 is adjusted by rotating the rear air mix door 56.

The rear-vent outlet door 58 is movable from a first position, shown in FIGS. 2A and 5, to a second position, shown in FIGS. 3 and 4. The rear-vent outlet door 58 regulates the amount or airflow that exits the rear vent outlet 60 and the heater outlet 62. Specifically, when the rear-vent outlet door 58 is in the first position the airflow is directed toward the heater outlet 62 and the rear HVAC unit 16 is in a heat mode. Similarly, when the rear-vent outlet door 58 is in the second position the airflow is directed toward the rear vent outlet 60 and the rear HVAC unit 16 is in a vent mode. When the rear-vent outlet door 58 is in any position between the first and second positions the airflow is directed toward both the rear vent outlet 60 and heater outlet 62 and the rear HVAC unit 16 is in a vent/heat mode.

The airflow directional door 22 is disposed between the first airflow path 36 and the second airflow path 54 and is movable from a first (or closed) position, shown in FIGS. 2A, 3, and 4, to a second (or open) position, shown in FIG. 5. Thus, the airflow directional door 22 serves as a movable or rotatable divider between the first airflow path 36 and the second airflow path 54 and regulates airflow from the rear blower 52 to the first airflow path 36. Specifically, when in the closed position, the airflow directional door 22 directs the airflow from the rear blower 52 to the second airflow path 54 thereby preventing the airflow from flowing into the first airflow path 36. When in the open position, the airflow directional door 22 directs the airflow from the rear blower 52 to the first airflow path 36 and prevents the airflow from flowing into the second airflow path 54. Therefore, an important feature of the HVAC system 10, as mentioned above, is that the airflow directional door 22, when open, directs all the airflow not only from the first portion 26, but also from the second portion 28 of the evaporator 18 toward the front of the vehicle, via the first airflow path 36, thereby providing optimum cooling to the front of the vehicle. It should be noted that the airflow directional door 22 is movable to any position between the first position and the second position. Thus, the airflow from the rear blower 52 can be directed the first airflow path 36 and the second airflow path 54 simultaneously.

In addition, when the airflow directional door 22 is in the open position the rear HVAC unit 16 is essentially in an "OFF" position because no airflow is directed toward the rear of the vehicle. In a conventional HVAC system when the rear HVAC unit is in an "OFF" position no air flows through the evaporator, which causes frost build-up in the evaporator and could lead to compressor lock-up. In the present invention, however, when the airflow directional door 22 is in the open position airflow from the rear blower 52 continues to flow through the second portion 28 of the evaporator 18 thereby preventing frost build-up in the evaporator 18 and eliminating potential compressor lock-up.

Figure 6:
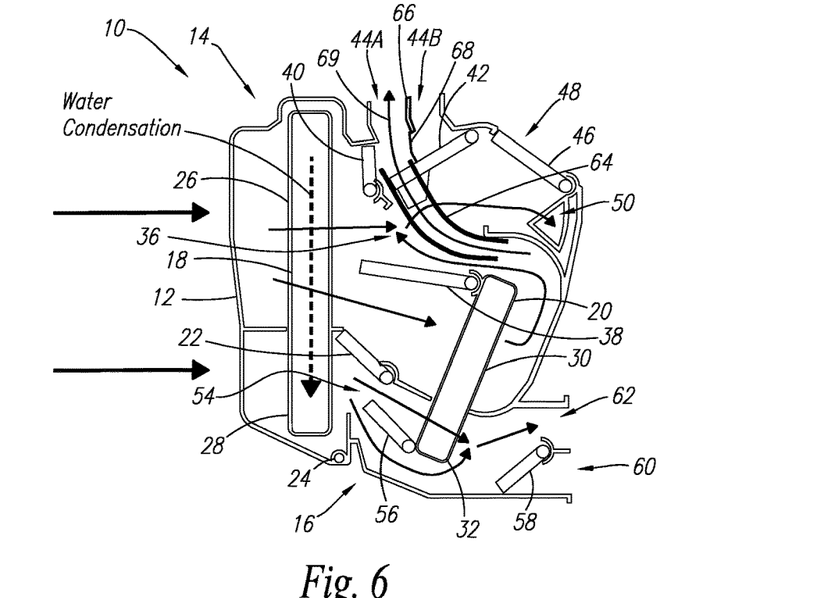
FIGS. 6 and 7 show schematic views of an HVAC system illustrating multiple airflow patterns according to another exemplary embodiment of the present invention.
Figure 7:
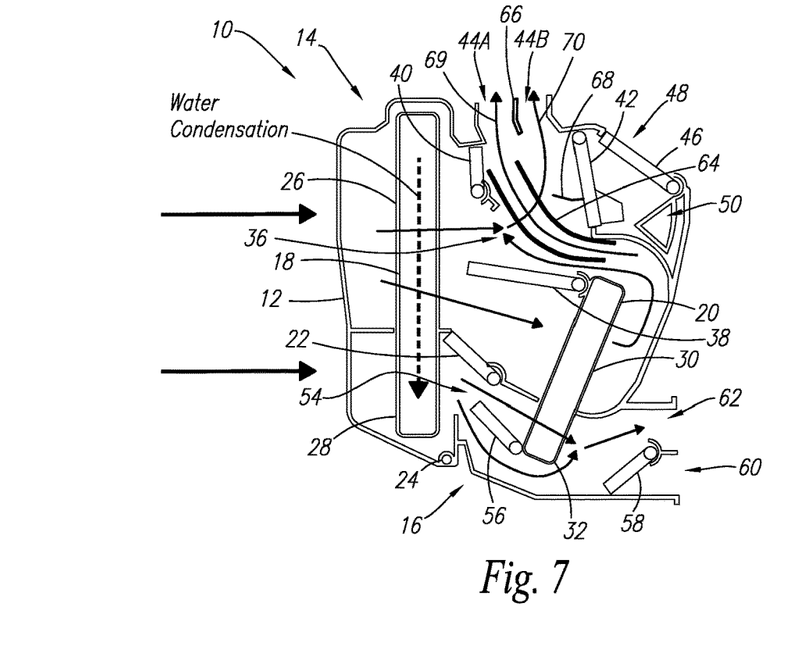

FIGS. 6 and 7 show a second embodiment of the HVAC system 10 in accordance with the present invention. The HVAC system 10 of the second embodiment is identical to the HVAC system 10 of the first embodiment except that the second embodiment includes a dual airflow defroster feature to control airflow through one or through multiple defroster outlets. For simplicity, the description for all elements in the second embodiment that are the same as the first embodiment will be omitted. Only the elements that differentiate the second embodiment from the first embodiment will be described.

In the second embodiment, the front HVAC unit 14 further includes a defroster duct 64 and a defroster outlet divider 66 disposed in the middle of the defroster outlet 44 thereby forming a first defroster outlet 44A and a second defroster outlet 44B. Further, the defroster outlet door 42 includes an air deflection bracket 68 that extends from the top of the defroster outlet door 42. The defroster outlet door 42 is movable to and between a first (or closed) position shown in FIGS. 2A, 3, and 5, a second position (or partially open), shown in FIG. 6, and a third (or open) position, shown in FIG. 7.

For simplicity, the defroster door 42 is shown in the first position in only the first embodiment. When in the first position, the defroster door 42 of the second embodiment functions the same as in the first embodiment. Specifically, when the defroster door 42 is in the first position the first defroster outlet 44A and the second defroster outlet 44B are closed and the airflow is directed toward the vent outlet 48 and the heater outlet 50, and the front HVAC unit 14 is in either a vent or heat mode, as explained above.

When the defroster door 42 is in the second position (FIG. 6) the air deflection bracket 68 remains in contact with the defroster outlet divider 66. Thus, in this position a first airflow 69 is directed through the defroster duct 64 and out the first defroster outlet 44A. The air deflection bracket 68, however, blocks the second defroster outlet 44B thereby preventing airflow from exiting through the second defroster outlet 44B.

When the defroster door 42 is in the third position both the first 44A and the second 44B defroster outlets are open. Thus, the first airflow 69 directed through the defroster duct 64 exits through the first defroster outlet 44A and a second airflow 70 exits through the second defroster outlet 44B, thereby providing a maximum airflow through the defroster.

It should be noted that the bypass door 40 works in the same manner in the second embodiment as in the first embodiment. Specifically, when the bypass door 40 is in the second position air from the evaporator 18 will flow directly to the first 44A and/or second 44B defroster outlets. Thus, the airflow temperature exiting the first 44A and/or second 44B defroster outlets can be adjusted without adjusting the position of the front air mix door 38.

FIGS. 8-12 show a third embodiment of the HVAC system 10 in accordance with the present invention. The HVAC system 10 of the third embodiment has the same features as the HVAC system 10 in both the first and second embodiments. One difference between the third embodiment and the first two embodiments is the orientation of the evaporator 18 and the heating core 20. In regards to the evaporator 18, the evaporator 18 is oriented in a more horizontal position than a vertical position. Specifically, the orientation of the evaporator 18 is such that the evaporator 18 slopes downward from the second portion 28 to the first portion 26 of the evaporator 18. In regards to the heating core 20, the heating core 20 is oriented in a substantially horizontal position.

Because the orientation of the evaporator 18 and the heating core 20 in the third embodiment are different than the orientation of the evaporator 18 and the heating core 20 in the first embodiment, the physical arrangement of the HVAC system 10 in the third embodiment differs from that of the first embodiment. The functionality, however, between the two embodiments remains the same and, thus, only those elements that differentiate the third embodiment from the first embodiment will be described.

Figure 13:
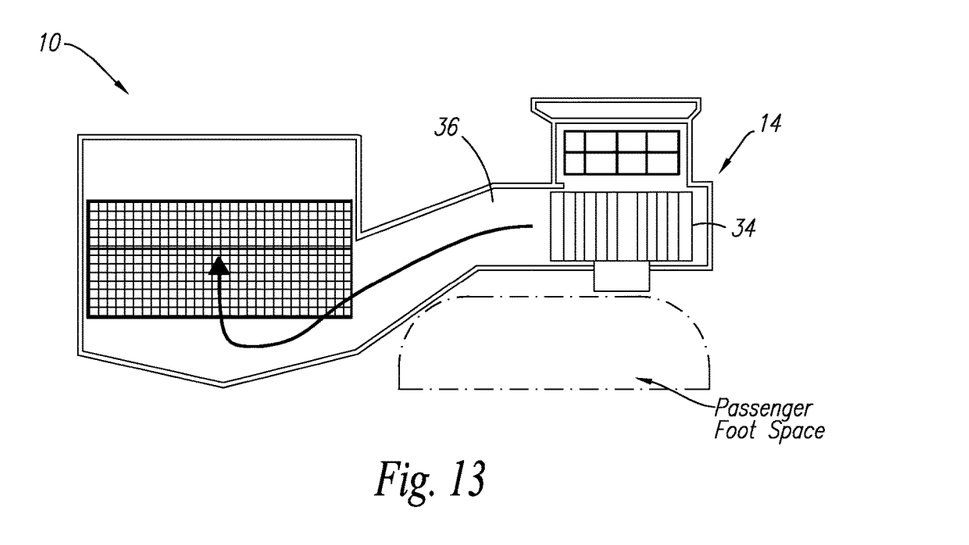
FIG. 13 shows a schematic side view of the HVAC system of FIGS. 8-12 as viewed from the passenger seat.

In regards to the physical arrangement of the HAVC system 10, the rear blower 52 is now positioned in a center of the HVAC system 10 and not adjacent to the front blower 34 as in the first embodiment. Specifically, the rear blower 52 is positioned in the center of the HVAC system 10 such that the rear blower 52 extends towards the vehicle passenger cabin into a center console (not shown). Thus, airflow from the rear blower 52 flows from the vehicle passenger cabin toward the front of the vehicle into the engine compartment and back into the vehicle passenger cabin. Further, referring to FIGS. 2B and 13, the passenger foot space increases in the third embodiment because the rear blower 52 is no longer located adjacent to the front blower, see FIG. 2B, but rather located in the center console area.

Figure 8:
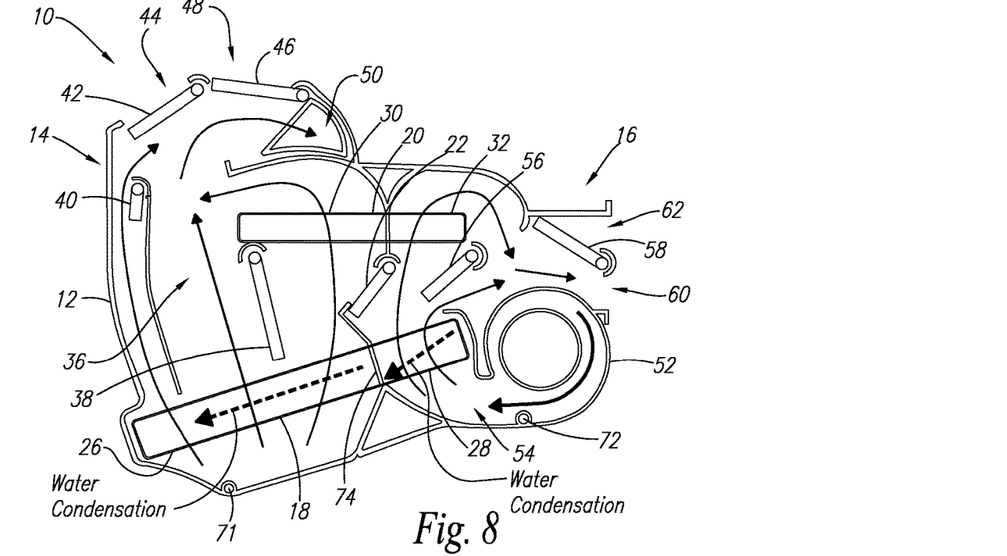
FIGS. 8-12 show schematic views of an HVAC system illustrating multiple airflow patterns according to yet another exemplary embodiment of the present invention.
Figure 9:
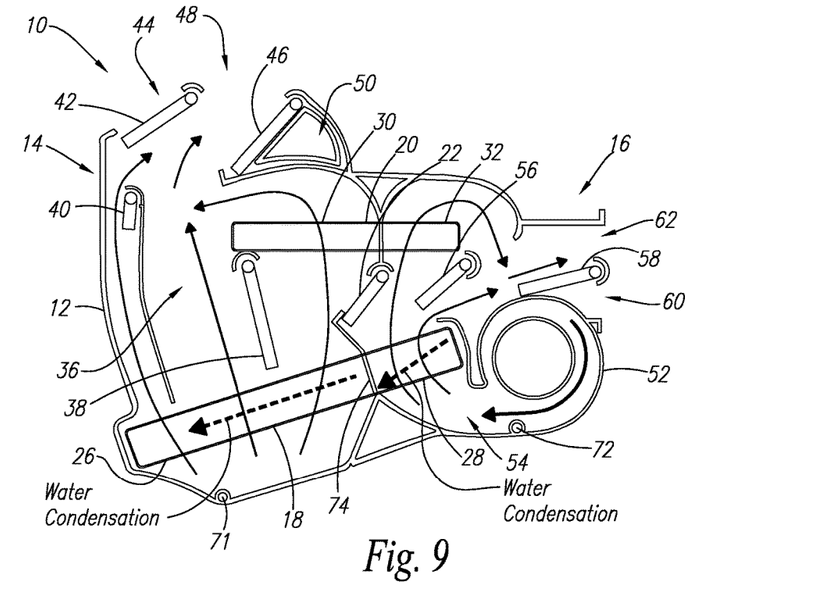
Figure 10:
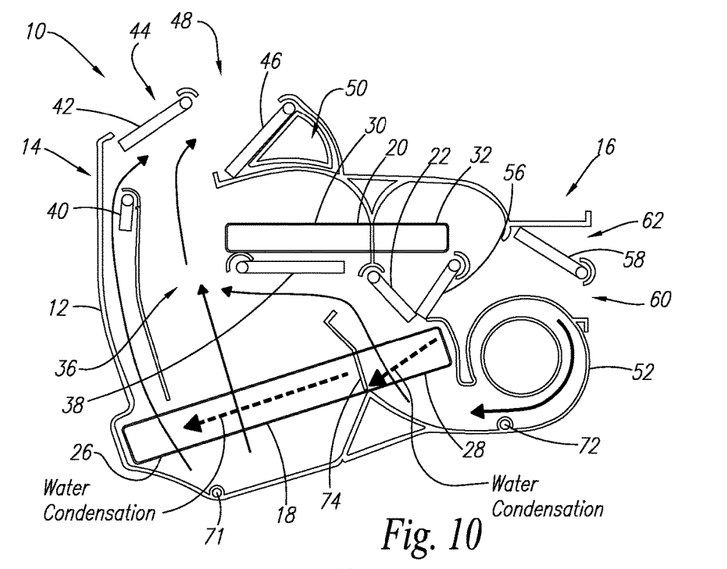
Figure 11:
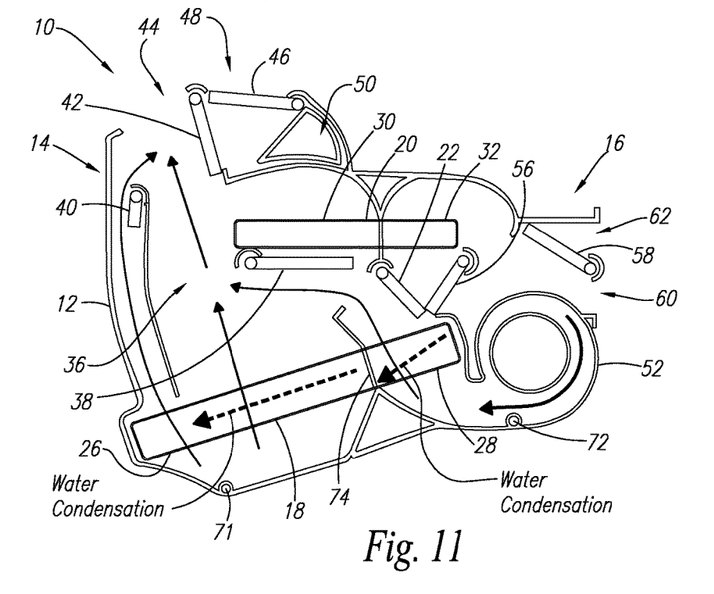
Figure 12:
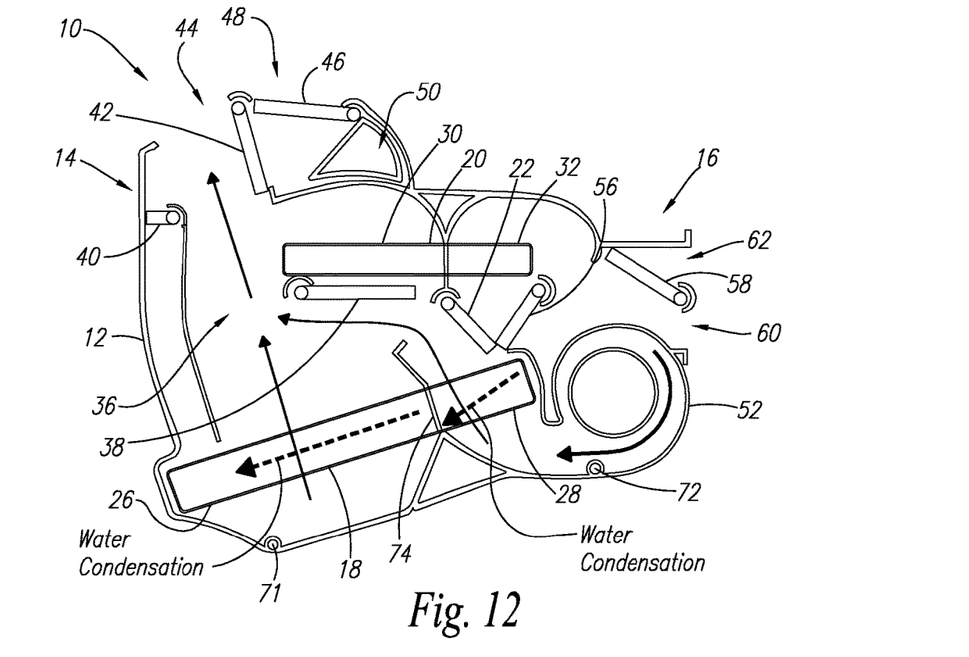

The front HVAC unit 14 further includes a front drain opening 71 and the rear HVAC unit 16 may include an optional rear drain opening 72. In addition, the evaporator 18 may include an optional seal 74 disposed between the first portion 26 and the second portion 28 of the evaporator 18. The seal 74 serves two purposes. First, the seal 74 prevents airflow in the first airflow path 36 from leaking to the second airflow path 54 and the airflow in the second airflow path 54 from leaking to the first airflow path 36. The seal 74 also directs the water condensation generated by the second portion 28 of the evaporator 18 downward into the second airflow path 54 where it exits the HVAC system 10 via the rear drain opening 72. Similarly, the water condensation generated by the first portion 26 of the evaporator 18 drains toward the front of the evaporator 18, as shown in FIG. 8, and exits the HVAC system 10 via the front drain opening 71.

Further, as mentioned above, high humidity fresh air from outside the vehicle circulates through the first portion 26 of the evaporator 18 and low humidity re-circulated air from inside the vehicle circulates through the second portion 28 of the evaporator 18. Thus, very little water condensation is generated in the second portion 28 of the evaporator 18 due to the low humidity re-circulated air. Therefore, the optional rear drain opening 72 and the optional seal 74

In summary, the present invention, as mentioned above, has several features including the requirement of only a single evaporator and heating core. The HVAC system also includes a bypass door to independently control airflow temperature exiting through defroster outlets irrespective of airflow temperature to exiting any other ventilation outlets in the system. In addition, a dual airflow defroster feature controls airflow through one or through multiple defroster outlets. The HVAC system further includes a directional door that when in a closed position directs all the air from the rear HVAC unit to the front of the vehicle to provide maximum airflow capacity to the front of the vehicle. Still further, the HVAC system includes a frost prevention feature to prevent frost build-up on the evaporator when the rear HVAC unit is in an "OFF" position.

While specific embodiments of the invention have been described and illustrated, it is to be understood that these embodiments are provided by way of example only and that the invention is not to be construed as being limited but only by proper scope of the following claims.

What is claimed is:
1. An HVAC system for a vehicle comprising:
a housing;
a front HVAC unit housed in the housing and having a front blower, a first airflow path, and a front air mix door, the first airflow path defined from the front blower to a front air outlet;
a rear HVAC unit housed in the housing and having a rear blower, a second airflow path, and a rear air mix door, the second airflow path defined from the rear blower to a rear air outlet;
an evaporator having a first portion disposed in the first airflow path and a second portion disposed in the second airflow path, the evaporator being oriented substantially vertical;
a heating core having a first portion disposed in the first airflow path and a second portion disposed in the second airflow path; and
a lone airflow directional door disposed between the first airflow path and the second airflow path at a lone communication channel therebetween to regulate airflow from the rear blower to the first airflow path, wherein the first and second airflow paths are segregated from one another at all positions along the first and second airflow paths other than the lone communication channel, the lone airflow directional door is disposed upstream from the heater core and is rotatable between a first position and a second position to selectively open and close the lone communication channel between the segregated first and second airflow paths,
wherein
when the airflow directional door is in the first position, the lone communication channel is closed such that communication between the first and second airflow paths is blocked and the airflow from the rear blower is directed through the second airflow path, and
when the airflow directional door is in the second position, the lone communication channel is open such that the first and second airflow paths communicate via the lone communication channel, the airflow from the rear blower is directed to the first airflow path, and the airflow directional door is positioned to block the second airflow path so as to prevent the airflow from the rear blower from flowing through the second airflow path past the airflow directional door.

2. The HVAC system of claim 1, wherein the airflow directional door is operable to be held in any position between the first position and the second position thereby allowing the rear blower to direct airflow to both the first airflow path and the second airflow path simultaneously.

3. The HVAC system of claim 2, wherein the airflow directional door is disposed downstream from the evaporator.

4. The HVAC system of claim 1, wherein the front HVAC unit further includes a bypass door movable between a first position and a second position, and wherein when the bypass door is in the second position a portion of airflow from the first portion of the evaporator bypasses the first airflow path and is directed directly to a front outlet such that a temperature of the airflow exiting the front outlet can be regulated independently of a position of the front air mix door.

5. The HVAC system of claim 1, wherein the front HVAC unit further includes a defroster communicating with a defroster outlet, a defroster outlet divider disposed in a middle of the defroster outlet thereby forming a first defroster outlet and a second defroster outlet, and a defroster outlet door having an air deflection bracket extending from a top of the defroster outlet door, and
the defroster outlet door is movable between a first position, a second position, and a third position.

6. The HVAC system of claim 5, wherein
when the defroster outlet door is in the first position the first defroster outlet and the second defroster outlet are closed and airflow in the first airflow path is directed to a vent outlet and/or a heater outlet,
when the defroster outlet door is in the second position the first defroster outlet is open and a first airflow is directed to the first defroster outlet, and the air deflection bracket remains in contact with the defroster outlet divider such that the second defroster outlet is closed, and
when the defroster outlet door is in the third position the first defroster outlet and the second defroster outlet are open and the first airflow is directed to the first defroster outlet and a second airflow is directed to the second defroster outlet.

7. The HVAC system of claim 1 further comprising a drain opening disposed in a bottom of the rear HVAC unit, wherein water condensation generated by both the first portion and the second portion of the evaporator drains out a bottom of the evaporator and exits the HVAC system via the drain opening.

8. An HVAC system for a vehicle comprising:
a housing;
a front HVAC unit housed in the housing and having a front blower, a first airflow path, a front air mix door, and a first drain opening, the first airflow path defined from the front blower to a front air outlet;
a rear HVAC unit housed in the housing and having a rear blower, a second airflow path, a rear air mix door, and a second drain opening, the second airflow path defined from the rear blower to a rear air outlet;
an evaporator having a first portion disposed in the first airflow path, a second portion disposed in the second airflow path, and a seal disposed between the evaporator first portion and the evaporator second portion, the evaporator being oriented substantially horizontally, the seal configured to block airflow in the first airflow path from leaking into the second airflow path via the evaporator;
a heating core having a first portion disposed in the first airflow path and a second portion disposed in the second airflow path;
a lone airflow directional door disposed between the first airflow path and the second airflow path to regulate airflow from the rear blower to the first airflow path;
a defroster duct communicating with a defroster outlet, a defroster outlet divider disposed in a middle of the defroster outlet thereby forming a first defroster outlet and a second defroster outlet, and a defroster outlet door having an air deflection bracket extending from a top of the defroster outlet door, the defroster outlet door being movable between a first position, a second position, and a third position,
wherein
the first and second airflow paths extend to a position downstream from the heating core and are segregated from one another at all positions along the first and second airflow paths other than a lone communication channel which is selectively opened and closed by the lone airflow directional door.

9. The HVAC system of claim 8, wherein the rear blower is positioned in a center of the HVAC system such that the rear blower extends from an engine compartment towards a vehicle passenger cabin and wherein airflow from the rear blower flows from the vehicle passenger cabin toward a front of the vehicle into the engine compartment and back into the vehicle passenger cabin.

10. The HVAC system of claim 8, wherein the orientation of the evaporator is such that the evaporator slopes downward from the second portion to the first portion.

11. The HVAC system of claim 8, wherein high humidity fresh air from outside the vehicle circulates through the first portion of the evaporator and low humidity re-circulated air from inside the vehicle circulates through the second portion of the evaporator.

12. The HVAC system of claim 8, wherein water condensation generated from the first portion of the evaporator exits the HVAC system via the first drain opening and water condensation generated from the second portion of the evaporator exits the HVAC system via the second drain opening.

13. The HVAC system of claim 8, wherein the airflow directional door being a single door which is rotatable between a first position and a second position,
wherein
when the lone airflow directional door is in the first position, the lone communication channel is closed such that communication between the first and second airflow paths via the lone communication channel is blocked and the airflow from the rear blower is directed to the second airflow path, and
when the lone airflow directional door is in the second position, the lone communication channel is open such that the first and second airflow paths communicate via the lone communication channel, the airflow from the rear blower is directed to the first airflow path, and the airflow directional door is positioned to block the second airflow path so as to prevent the airflow from the rear blower from flowing through the second airflow path past the airflow directional door.

14. The HVAC system of claim 13, wherein the airflow directional door is operable to be held in any position between the first position and the second position thereby allowing the rear blower to direct airflow to both the first airflow path and the second airflow path simultaneously.

15. The HVAC system of claim 13, wherein the airflow directional door is disposed downstream from the evaporator and upstream from the heater core.

16. The HVAC system of claim 8, wherein the front HVAC unit further includes a bypass door movable between a first position and a second position, and wherein when the bypass door is in the second position a portion of airflow from the first portion of the evaporator bypasses the first airflow path and is directed directly to a front outlet such that a temperature of the airflow exiting the front outlet can be regulated independently of a position of the front air mix door.

17. The HVAC system of claim 8, wherein
when the defroster outlet door is in the first position the first defroster outlet and the second defroster outlet are closed and airflow in the first airflow path is directed to a vent outlet and/or a heater outlet,
when the defroster outlet door is in the second position the first defroster outlet is open and a first airflow is directed to the first defroster outlet, and the air deflection bracket remains in contact with the defroster outlet divider such that the second defroster outlet is closed, and
when the defroster outlet door is in the third position the first defroster outlet and the second defroster outlet are open and the first airflow is directed to the first defroster outlet and a second airflow is directed to the second defroster outlet.

18. An HVAC system for a vehicle comprising:
a housing;
a front HVAC unit housed in the housing and having a front blower, a first airflow path, and a front air mix door, the first airflow path defined from the front blower to a front air outlet;
a rear HVAC unit housed in the housing and having a rear blower, a second airflow path, and a rear air mix door, the second airflow path defined from the rear blower to a rear air outlet;
an evaporator having a first portion disposed in the first airflow path and a second portion disposed in the second airflow path, the evaporator being oriented substantially vertically;
a heating core having a first portion disposed in the first airflow path and a second portion disposed in the second airflow path; and
a lone airflow directional door disposed upstream from the heating core and between the first airflow path and the second airflow path at a lone communication channel therebetween to regulate airflow from the rear blower to the first airflow path, wherein the first and second airflow paths extend to a position downstream from the heating core and are segregated from one another at all positions along the first and second airflow paths other than the lone communication channel such that airflow from the front blower does not mix with the airflow from the rear blower within the housing when the lone communication channel is closed by the lone airflow directional door.

19. The HVAC system of claim 18, wherein the airflow directional door is operable to be held in any position between a first position and a second position, the first position being a position at which an opening of the lone communication channel is entirely blocked and the second position being a position at which the opening of the lone communication channel is at a maximum, wherein the lone communication channel is partially opened when the airflow directional door is between the first and second positions thereby allowing the rear blower to direct airflow to both the first airflow path and the second airflow path simultaneously.

20. The HVAC system of claim 18, wherein the front HVAC unit further includes a defroster communicating with a defroster outlet, a defroster outlet divider disposed in a middle of the defroster outlet thereby forming a first defroster outlet and a second defroster outlet, and a defroster outlet door having an air deflection bracket extending from a top of the defroster outlet door, and
the defroster outlet door is movable between a first position, a second position, and a third position.

21. The HVAC system of claim 20, wherein
when the defroster outlet door is in the first position the first defroster outlet and the second defroster outlet are closed and airflow in the first airflow path is directed to a vent outlet and/or a heater outlet,
when the defroster outlet door is in the second position the first defroster outlet is open and a first airflow is directed to the first defroster outlet, and the air deflection bracket remains in contact with the defroster outlet divider such that the second defroster outlet is closed, and
when the defroster outlet door is in the third position the first defroster outlet and the second defroster outlet are open and the first airflow is directed to the first defroster outlet and a second airflow is directed to the second defroster outlet.

* * * * *